United States Patent
Artamonov et al.

(10) Patent No.: US 11,462,025 B2
(45) Date of Patent: Oct. 4, 2022

(54) METHOD OF AND SYSTEM FOR DETERMINING TRAFFIC SIGNAL STATE

(71) Applicant: YANDEX SELF DRIVING GROUP LLC, Moscow (RU)

(72) Inventors: Aleksey Sergeevich Artamonov, p Metallost (RU); Dmitry Alekseevich Kalyuzhny, Saint Petersburg (RU); Yuliya Alekseevna Yakovleva, Chelyabinsk (RU)

(73) Assignee: YANDEX SELF DRIVING GROUP LLC, Moscow (RU)

( * ) Notice: Subject to any disclaimer, the term of this patent is extended or adjusted under 35 U.S.C. 154(b) by 64 days.

(21) Appl. No.: 17/035,103

(22) Filed: Sep. 28, 2020

(65) Prior Publication Data

US 2021/0201058 A1 Jul. 1, 2021

(30) Foreign Application Priority Data

Dec. 25, 2019 (RU) .............................. 2019143928

(51) Int. Cl.
*G06K 9/00* (2022.01)
*G06K 9/62* (2022.01)
(Continued)

(52) U.S. Cl.
CPC ......... *G06V 20/584* (2022.01); *G06K 9/6227* (2013.01); *G06K 9/6257* (2013.01);
(Continued)

(58) Field of Classification Search
CPC ...... G06V 20/584; G06V 20/46; G06V 20/54; G06N 20/20; G06K 9/6227; G06K 9/6257
See application file for complete search history.

(56) References Cited

U.S. PATENT DOCUMENTS 6,430,305 B1 * 8/2002 Decker ................ G06K 9/6292
340/5.41
8,981,964 B2  3/2015 Matsumura
(Continued)

FOREIGN PATENT DOCUMENTS

DE  102012108863 A1  5/2014
EP     3296931 B1     1/2019
(Continued)

OTHER PUBLICATIONS

Nienhuser et al., "Visual state estimation of traffic lights using hidden Markov models", Intelligent Transportation Systems (ITSC), 2010, 13th International IEE annual conference on Intelligent Transportation Systems, Madeira Island, Portugal, Sep. 19-22, 2010, pp. 1705-1710.

Possatti et al.,"Traffic Light Recognition Using Deep Learning and Prior Maps for Autonomous Cars", 2019 International Joint Conference on Neural Networks (IJCNN), IEEE. Jul. 14, 2019, pp. 1-8, DOI: 10.1109/IJCNN.2019.8851927.
(Continued)

*Primary Examiner* — David F Dunphy
(74) *Attorney, Agent, or Firm* — BCF LLP

(57) ABSTRACT

There is disclosed a method and system for determining a predicted state of a traffic signal. A video of the traffic signal is received. Still images of the traffic signal are generated based on the video. A first machine learning algorithm (MLA) outputs a vector for each bulb in each still image, the vector indicating a predicted status of the bulb. A second MLA determines a predicted state of the traffic signal based on the vectors.

20 Claims, 8 Drawing Sheets

(51) Int. Cl.
  *G06N 20/20* (2019.01)
  *G06V 20/58* (2022.01)
  *G06V 20/40* (2022.01)
  *G06V 20/54* (2022.01)

(52) U.S. Cl.
  CPC ............ *G06N 20/20* (2019.01); *G06V 20/46* (2022.01); *G06V 20/54* (2022.01)

(56) References Cited

U.S. PATENT DOCUMENTS

| | | |
|---|---|---|
| 9,145,140 B2 | 9/2015 | Ferguson et al. |
| 9,396,657 B1 | 7/2016 | Bauer et al. |
| 9,442,487 B1 | 9/2016 | Ferguson et al. |
| 9,928,738 B2 | 3/2018 | Bauer et al. |
| 9,947,219 B2 | 4/2018 | Rolle et al. |
| 9,990,548 B2 | 6/2018 | Wellington et al. |
| 10,008,113 B2 | 6/2018 | Ova et al. |
| 2017/0024622 A1 | 1/2017 | Mizutani et al. |
| 2018/0112997 A1 | 4/2018 | Fasola et al. |
| 2019/0130198 A1 | 5/2019 | Hayashi |
| 2019/0251707 A1* | 8/2019 | Gupta ................. G06T 9/002 |

FOREIGN PATENT DOCUMENTS

| | | | |
|---|---|---|---|
| RU | 2655256 C1 | 5/2018 | |
| WO | WO 2020/243484 * | 3/2020 | ............ G06K 9/00 |

OTHER PUBLICATIONS

Jensen et al., "Vision for Looking at Traffic Lights: Issue, Survey, and Perspectives", IEEE Transactions on Intelligent Transportation Systems, IEEE, Piscataway. NJ, USA, vol. 17, No. 7, Jul. 1, 2016, pp. 1800-1815, DOI: 10.1109/TITS.2015.2509509.

Behrendt et al., "A deep learning approach to traffic lights: Detection, tracking, and classification", 2017 IEEE International Conference on Robotics and Automation (ICRA), IEEE. May 29, 2017, pp. 1370-1377, DOI: 10.1109/ICRA.2017.7989163.

Du et al., "Vision-Based Traffic Light Detection for Intelligent Vehicles", 2017, 4th International Conference on Information Science and Control Engineering (ICISCE), IEEE, Jul. 21, 1017, pp. 1323-1326, DOI: 10.1109/ICISCE.2017.275.

John et al.,"Traffic light recognition in varying illumination using deep learning and saliency map", 17th International IEE Conference on Intelligent Transportation Systems (ITSC), IEEE, Oct. 8, 2014, pp. 2286-2291, DOI: 10.1109/ITSC.2014.6958056.

Gomez et al.,"Traffic lights detection and state estimation using hidden Markov Models", 2014, IEEE Intelligent Vehicles Symposium (IV), Jun. 8-11, 2014, Dearborn, Michigan, USA, pp. 750-755, DOI:10.1109/IVS.2014.6856486.

European Search Report dated Apr. 1, 2021 issued in respect of the counterpart European Patent Application No. 20201690.3.

Russian Search report dated Jul. 26, 2021 in respect of the counterpart Russian Patent Application RU 2019143928.

* cited by examiner

| Time | State = green | State = red | State = yellow | State = flashing |
|---|---|---|---|---|
| Time = 0s | 1 | 0 | 0 | 0 |
| Time = 5s | 1 | 0 | 0 | 0 |
| Time = 10s | 0 | 0 | 1 | 0 |
| Time = 15s | 0 | 1 | 0 | 0 |

Figure 6

METHOD OF AND SYSTEM FOR DETERMINING TRAFFIC SIGNAL STATE

CROSS-REFERENCE

The present application claims priority to Russian Patent Application No. 2019143928, entitled "Method of and System for Determining Traffic Signal State", filed Dec. 25, 2019, the entirety of which is incorporated herein by reference.

FIELD

The present technology relates to analyzing a video of a traffic signal in general and, more specifically, to a method of and a system for determining a predicted state of a traffic signal.

BACKGROUND

Traffic signals are designed to provide instructions to human drivers. Although traffic signals are easily comprehended by people, these signals can be difficult to accurately interpret using software. Accurately identifying the state of a traffic signal can be particularly important in various applications, such as driver-assistive technologies and self-driving cars. If the state of the traffic signal is incorrectly determined or cannot be determined, these technologies might not function properly.

Videos or images of traffic signals may be captured by cameras on a car or other vehicle. The videos may be distorted due to weather conditions or other environmental factors, movement of the car, distance of the car from the traffic signal, etc. Traffic signals, and in particular traffic signals using light emitting diodes (LEDs), may flicker in a way that is invisible to the human eye but is captured on camera. Traffic signals may display symbols, such as an arrow, which might not be apparent on images captured by a camera. For example from a distance and/or in certain conditions the color of a green arrow may be captured in an image, but the arrow shape might not be apparent in the image. These and various other factors can present difficulties when determining the state of a traffic signal.

DE 102012108863A1 assigned to Continental Teves AG & CO OHG and Conti Temic Microelectronic, and filed on Sep. 20, 2012, describes recording a sequence of images of a vehicle surrounding with a camera, and recognizing the probable presence of a traffic light from the recorded image data. The current traffic state is classified. The validation of classification of the current traffic state is carried out under consideration of the traffic light state that is classified from a preceding image in the image sequence. An independent claim is included for a device for recognizing a state of a traffic light.

US 2017/0024622 A1 assigned to Honda Motor Co., Ltd., and filed on Jul. 24, 2015, describes a surrounding environment recognition device that includes an image capturing unit that captures a peripheral image, and a traffic signal recognizing unit that recognizes a traffic signal from within the peripheral image. The image capturing unit captures a plurality of images of frames. The traffic signal recognizing unit recognizes the traffic signal based on a combination of the plurality of images of frames.

SUMMARY

Developers of the present technology have appreciated at least one technical problem associated with the prior art approaches.

The present technology relates to detecting the state of a traffic light in general, and more specifically to methods and systems for determining a predicted state of a traffic signal. As has been alluded to above, determining the state of a traffic signal can be difficult, particularly in adverse weather conditions. Various techniques have been developed for determining a predicted state of a traffic signal.

One or more cameras may be used to capture videos and/or images of one or more traffic signals. A series of still images may be captured from the videos at a pre-determined interval. Each of the still images may be input to a machine learning algorithm (MLA). The MLA may output a predicted status of each bulb of the traffic signal in each of the still images. The predicted status may indicate a probability that the bulb is lit, and a probability for each available color of the bulb, such as red, green, yellow, etc. The predicted status may be in the format of a vector.

Before generating a prediction, the MLA may be trained using training data comprising labeled data points. Each of the data points may include a still image of a traffic signal and a corresponding label, where the label indicates the actual status of each bulb of the traffic signal. The labels may have been input by a person viewing the image.

The predicted status vectors may be input to a second MLA that predicts the state of the traffic signal. The second MLA may be trained using a set of vectors output by the first MLA with corresponding labels, where the labels indicate the actual state of the traffic signal, such as 'green,' 'yellow,' 'red,' 'arrow,' 'flashing,' etc. After being trained, the second MLA may receive vectors output by the first MLA as input. The second MLA may process the vectors and output a prediction of the state of the traffic signal. The output prediction may be in the format of a vector indicating the predicted probability of each possible state of the traffic signal.

According to a first broad aspect of the present technology, there is provided a method for determining a predicted state of a traffic signal. The method is executable on a server and comprises: receiving, by the server, a video of the traffic signal; generating, based on the video, a plurality of still images of the traffic signal; determining, for each still image of the plurality of still images, and by a first Machine Learning Algorithm (MLA), a vector for each bulb in the respective still image, thereby generating a plurality of vectors corresponding to the video, each vector indicating a predicted likelihood of each of a plurality of statuses of the respective bulb, the first MLA having been trained based on a plurality of labeled still images of traffic signals, and each labeled still image of the plurality of labeled still images indicating a status of each bulb of the respective labeled still image; determining, based on the plurality of vectors, and by a second MLA, the predicted state of the traffic signal, the second MLA having been trained based on a plurality of labeled vectors, wherein each labeled vector is indicative of a predicted likelihood of each of the plurality of statuses for a given bulb of a given traffic signal, and wherein each labeled vector is associated with a label indicating an actual state of the given traffic signal; and storing an indicator of the predicted state of the traffic signal.

In some implementations of the method, the plurality of statuses comprise a pre-defined set of statuses.

In some implementations of the method, a first status of the plurality of statuses corresponds to a first color and a second status of the plurality of statuses corresponds to a second color.

In some implementations of the method, a third status of the plurality of statuses indicates whether the bulb is lit.

In some implementations of the method, the predicted state of the traffic signal indicates a predicted color displayed by the traffic signal.

In some implementations of the method, the predicted state of the traffic signal indicates a predicted symbol displayed by the traffic signal.

In some implementations of the method, the predicted state of the traffic signal indicates a predicted pattern displayed by the traffic signal.

In some implementations of the method, the plurality of labeled vectors were generated using the first MLA.

In some implementations of the method, the method further comprises storing the plurality of vectors in a matrix and inputting the matrix to the second MLA.

In some implementations of the method, the method further comprises determining, based on stored location data of traffic signals, coordinates of the traffic signal in the video.

In some implementations of the method, the first MLA predicts a color displayed by each bulb in an input still image.

In accordance with yet another broad aspect of the present technology, there is provided a method for determining a predicted state of a traffic signal. The method is executable on a server and comprises: receiving, by the server, a video of a plurality of traffic signals, wherein the plurality of traffic signals comprises the traffic signal; generating, based on the video, a plurality of still images of the plurality of traffic signals; determining, for each still image of the plurality of still images, and by a first Machine Learning Algorithm (MLA), a vector for each bulb in the respective still image, thereby generating a plurality of vectors corresponding to the video, each vector indicating a predicted likelihood of each of a plurality of statuses of the respective bulb, the first MLA having been trained based on a plurality of labeled still images of traffic signals, and each labeled still image of the plurality of labeled still images indicating a status of each bulb of the respective labeled still image; determining, based on the plurality of vectors, and by a second MLA, a predicted state of each of the plurality of traffic signals, the second MLA having been trained based on a plurality of labeled vectors, wherein each labeled vector indicating a predicted likelihood of each of the plurality of statuses for a given bulb of a given traffic signal, and wherein each labeled vector is associated with a label indicating an actual state of the given traffic signal; determining, based on the predicted state of each of the plurality of traffic signals, the predicted state of the traffic signal; and storing an indicator of the predicted state of the traffic signal.

In some implementations of the method, determining the predicted state of the traffic signal comprises comparing the predicted state of each of the plurality of traffic signals.

In some implementations of the method, the second MLA outputs an indicator of confidence for each predicted state, and wherein determining the predicted state of the traffic signal further comprises comparing the indicators of confidence for each of the predicted states of each of the plurality of traffic signals.

In some implementations of the method, the plurality of labeled vectors were generated using the first MLA.

In some implementations of the method, generating the plurality of still images comprising capturing, at a predefined interval, frames of the video.

In some implementations of the method, the method further comprises storing the plurality of vectors in a matrix and inputting the matrix to the second MLA.

In some implementations of the method, the method further comprises determining, based on stored location data of traffic signals, coordinates of each of the traffic signals in the video.

In accordance with yet another broad aspect of the present technology, there is provided a system for determining a predicted state of a traffic signal. The system comprises a processor and a non-transitory computer-readable medium comprising instructions. The processor, upon executing the instructions, is configured to: receive a video of the traffic signal; generate, based on the video, a plurality of still images of the traffic signal; determine, for each still image of the plurality of still images, and by a first Machine Learning Algorithm (MLA), a vector for each bulb in the respective still image, thereby generating a plurality of vectors corresponding to the video, wherein each vector indicates a predicted likelihood of each of a plurality of statuses of the respective bulb, wherein the first MLA is trained based on a plurality of labeled still images of traffic signals, and wherein each labeled still image of the plurality of labeled still images indicates a status of each bulb of the respective labeled still image; determine, based on the plurality of vectors, and by a second MLA, the predicted state of the traffic signal, wherein the second MLA is trained based on a plurality of labeled vectors, wherein each labeled vector indicates a predicted likelihood of each of the plurality of statuses for a bulb of a traffic signal, and wherein each labeled vector is associated with a label indicating a state of the traffic signal; and store an indicator of the predicted state of the traffic signal.

In some implementation of the system, the processor, upon executing the instructions, is further configured to store the plurality of vectors in a matrix and input the matrix to the second MLA.

In the context of the present specification, a "server" is a system and/or computer program that is running on appropriate hardware and is capable of receiving requests (e.g. from electronic devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server."

In the context of the present specification, "electronic device" is any computer hardware that is capable of running software appropriate to the relevant task at hand. Thus, some (non-limiting) examples of electronic devices include personal computers (desktops, laptops, netbooks, etc.), smartphones, and tablets, as well as network equipment such as routers, switches, and gateways. It should be noted that a device acting as an electronic device in the present context is not precluded from acting as a server to other electronic devices. The use of the expression "a electronic device" does not preclude multiple electronic devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "computer usable information storage medium" is intended to include media of any nature and kind whatsoever, including RAM, ROM, disks (CD-ROMs, DVDs, floppy disks, hard drives, etc.), USB keys, solid state-drives, tape drives, etc.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a document could include the document itself (i.e. its contents), or it could be a unique document descriptor identifying a file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, the words "first," "second," "third," etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the servers, nor is their use (by itself) intended to imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware and/or share software and/or hardware. In other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 6 depicts a labeled representation of a traffic signal video in accordance with embodiments of the present technology.

DETAILED DESCRIPTION

Figure 1:
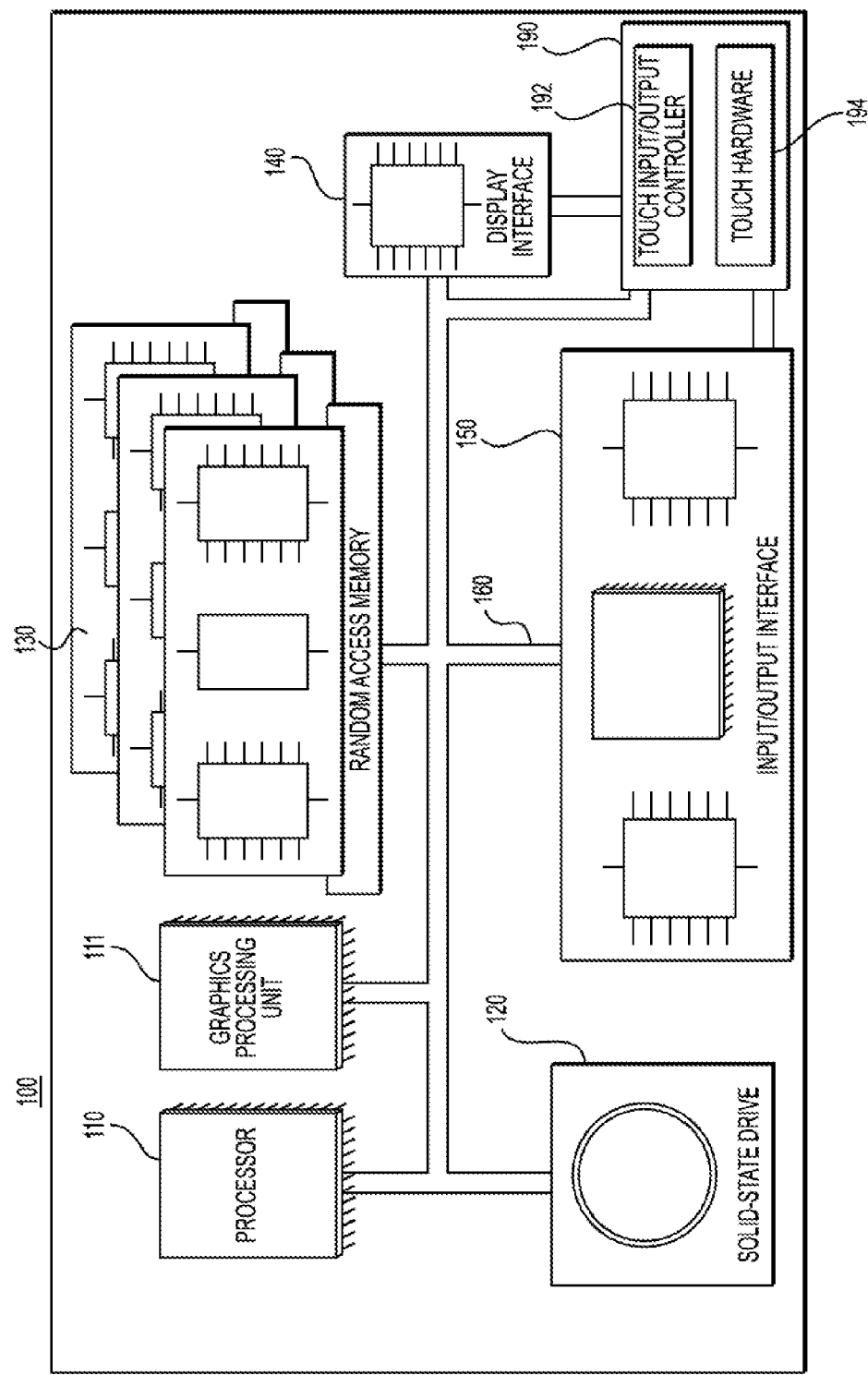
FIG. 1 is an illustration of components and features of a computing device in accordance with embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit," may be provided through the use of dedicated hardware as well as hardware capable of executing software in association with appropriate software. When provided by a processor, the functions may be provided by a single dedicated processor, by a single shared processor, and/or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and/or non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

With reference to FIG. 1, there is shown a computing device 100 suitable for use with some implementations of the present technology. The computing device 100 comprises various hardware components including one or more single or multi-core processors collectively represented by processor 110, a graphics processing unit (GPU) 111, a solid-state drive 120, a random access memory 130, a display interface 140, and an input/output interface 150.

Communication between the various components of the computing device 100 may be enabled by one or more internal and/or external buses 160 (e.g. a PCI bus, universal serial bus, IEEE 1394 "Firewire" bus, SCSI bus, Serial-ATA bus, etc.), to which the various hardware components are electronically coupled.

The input/output interface 150 may be coupled to a touchscreen 190 and/or to the one or more internal and/or external buses 160. The touchscreen 190 may be part of the display. In some embodiments, the touchscreen 190 is the display. The touchscreen 190 may equally be referred to as a screen 190. In the embodiments illustrated in FIG. 1, the touchscreen 190 comprises touch hardware 194 (e.g., pressure-sensitive cells embedded in a layer of a display allowing detection of a physical interaction between a user and the display) and a touch input/output controller 192 allowing communication with the display interface 140 and/or the one or more internal and/or external buses 160. In some embodiments, the input/output interface 150 may be connected to a keyboard (not shown), a mouse (not shown) or a trackpad (not shown) allowing the user to interact with the computing device 100 in addition to or instead of the touchscreen 190.

According to implementations of the present technology, the solid-state drive 120 stores program instructions suitable for being loaded into the random access memory 130 and executed by the processor 110 and/or the GPU 111. For example, the program instructions may be part of a library or an application.

The computing device 100 may be a server, a desktop computer, a laptop computer, a tablet, a smartphone, a personal digital assistant or any device that may be configured to implement the present technology, as should be understood by a person skilled in the art. The computing device 100 may be integrated in a car or other vehicle. The computing device 100 may control the car, such as in a self driving car.

Figure 2:
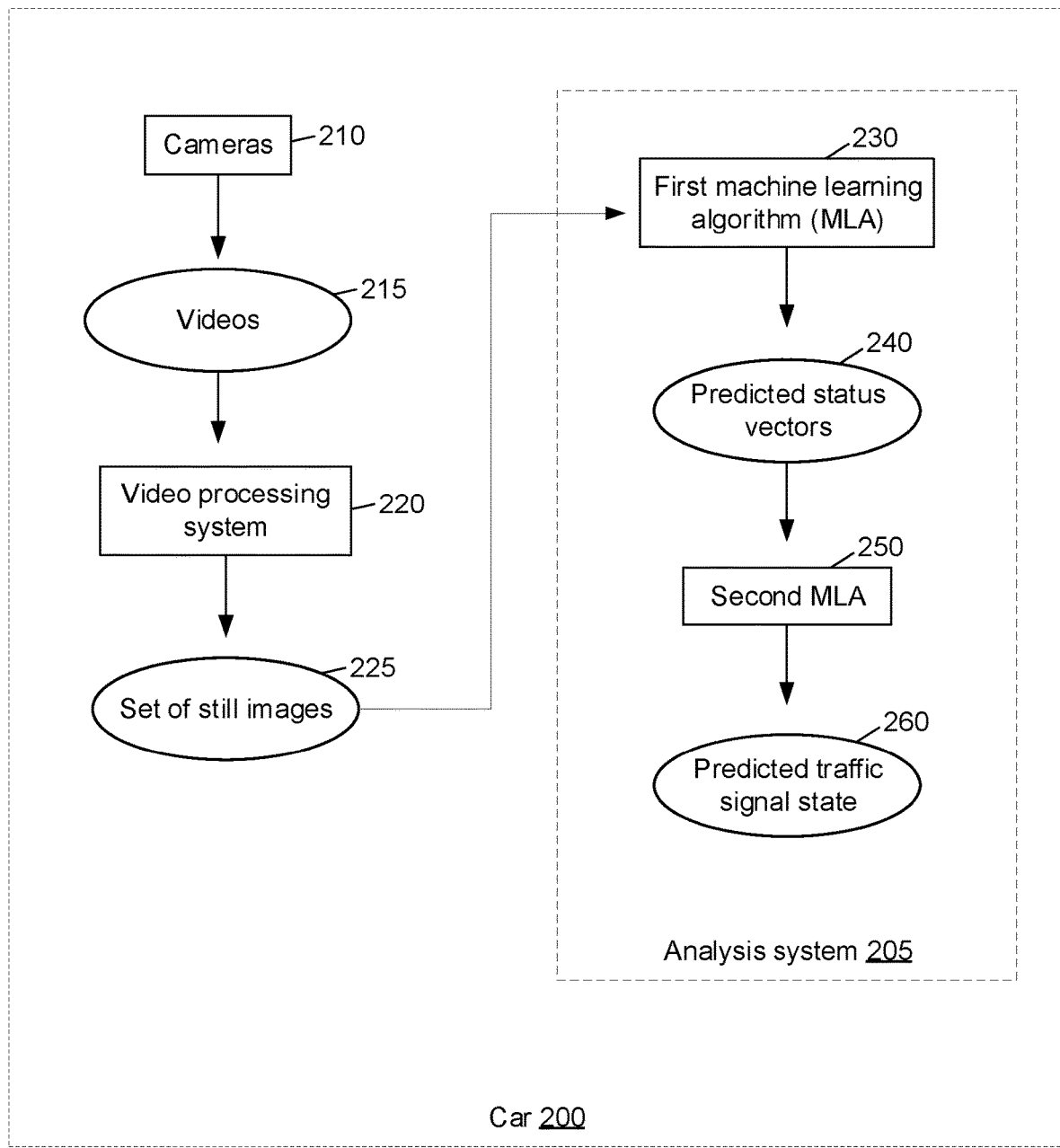
FIG. 2 depicts a diagram of a system implemented in accordance with non-limiting embodiments of the present technology.

With reference to FIG. 2, there is depicted a schematic illustration of a car 200, the car 200 implemented according to non-limiting embodiments of the present technology. Although described as a car, the car 200 may be a truck, motorcycle and/or any other type of motorized vehicle. The car 200 may be a fully or partially autonomous vehicle, such as a self-driving car. The car 200 comprises one or more cameras 210. The cameras 210 may be mounted on and/or integrated within the car 200. The cameras 210 may be positioned outside of the car 200 and/or inside of the car 200. The cameras 210 may be part of a sensor array attached to the car 200. For example the car 200 may have three external cameras 210 outside of the car 200 and two internal cameras 210 inside the car 200. The internal cameras 210 may be protected from the rain by virtue of being inside the car 200.

The cameras 210 may record one or more videos 215. The videos 215 may be recorded during operation of the car 200. The videos 215 may include images of traffic signals. A video processing system 220 may receive and/or process videos 215 captured by the cameras 210. The video processing system 220 may convert the videos 215 to a set of still images 225. For example frames may be extracted from the videos 215 to form the set of still images 225. The still images 225 may be captured at predetermined intervals in the videos 215, such as every 50 ms. The cameras 210 may record video at any suitable frame rate, such as 30 Hz.

The video processing system 220 may isolate one or more traffic signals in the videos 215. The videos 215 or still images 225 may be cropped to isolate the traffic signals. The locations of the traffic signals may have been previously recorded, such as while mapping an intersection or retrieved from a High Definition (HD) map or another type of a road graph. The road graph is a structure that maps roads, road lanes, traffic lights, as well as traffic rules and regulations in association with segments of a road. This pre-recorded information may be used to determine coordinates in the videos 215 corresponding to the traffic signals. In addition to or instead of this technique other methods may be used to isolate the traffic signals, such as using image recognition to determine a position of traffic signals in the videos 215 or still images 225. The individual bulbs of the traffic signal may be isolated. For example an image of a traffic signal having three bulbs may be split into three different images, each of the three images containing a single bulb.

Figure 7:
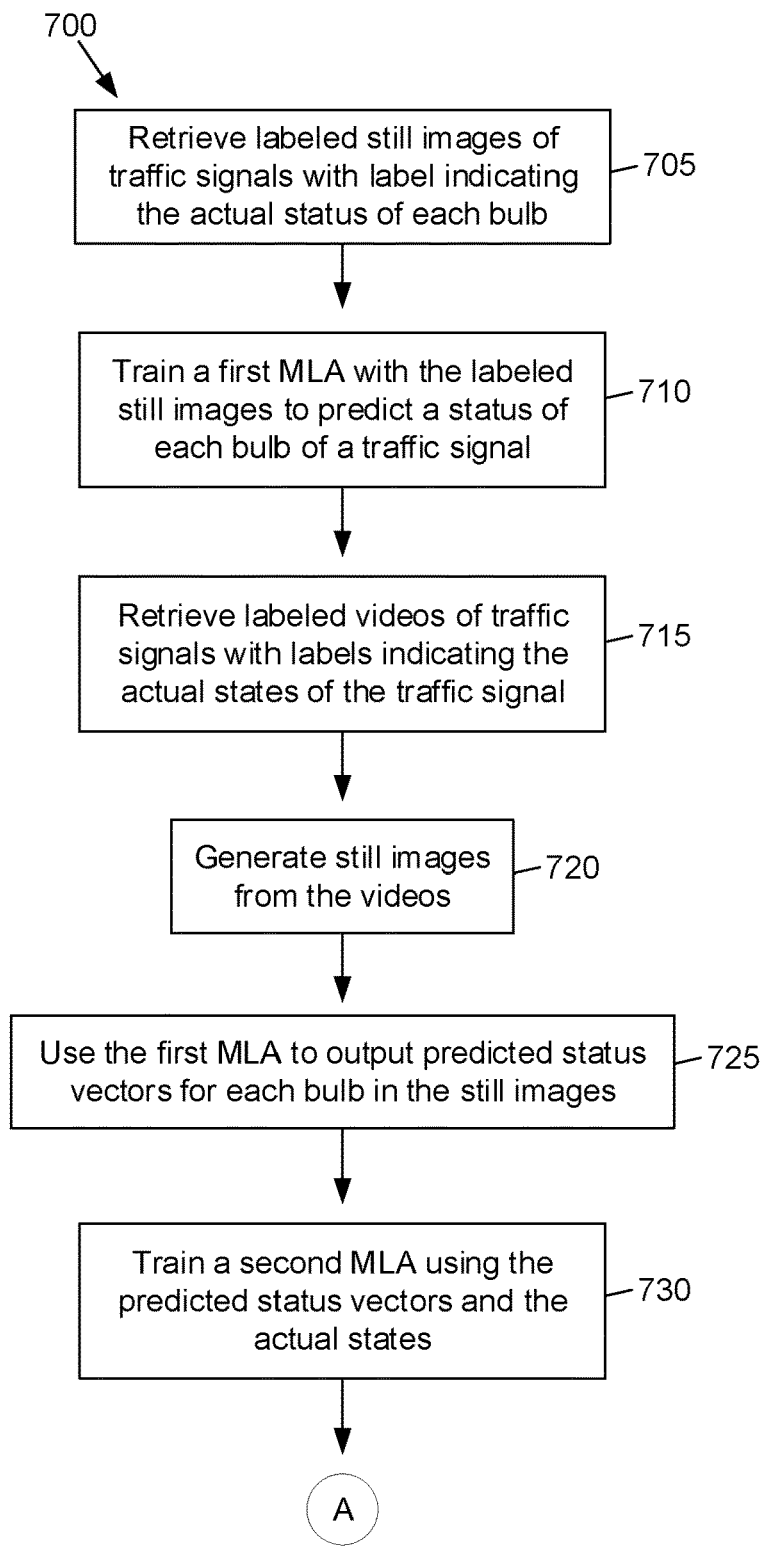
FIGS. 7 and 8 depict a flow diagram of a method for determining a predicted state of a traffic signal, the method executable within the system of FIG. 2 in accordance with some non-limiting embodiments of the present technology.
Figure 8:
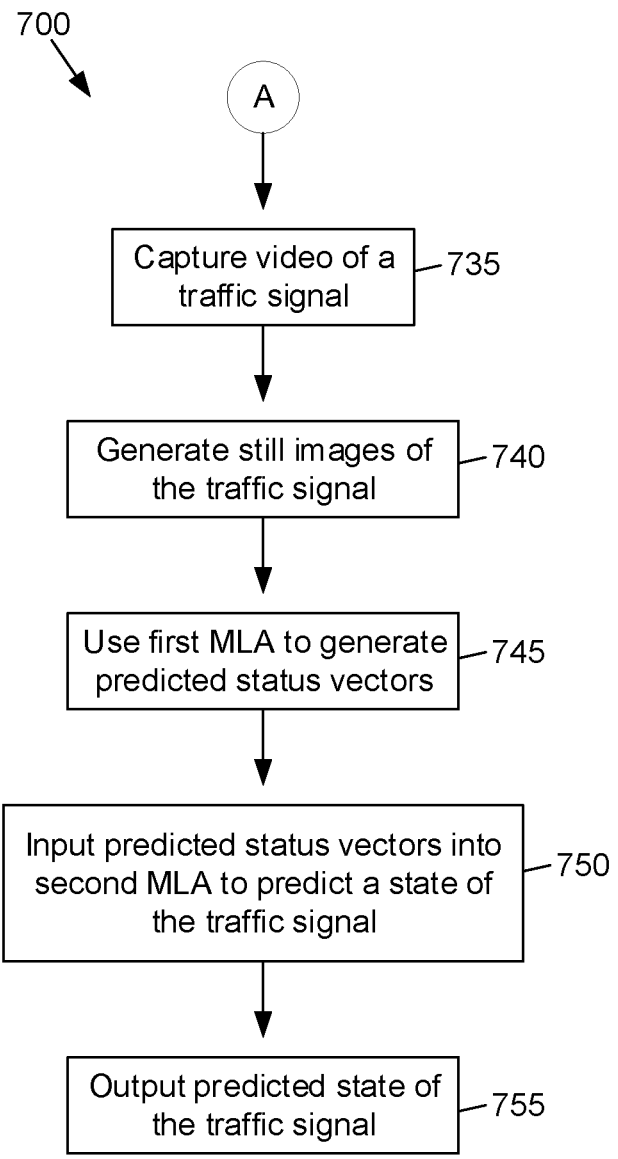

After generating the set of still images 225, all or a portion of the still images 225 may be transmitted from the video processing system 220 to an analysis system 205. FIGS. 7 and 8, described below, illustrate actions that may be performed by the video processing system 220 and/or analysis system 205. The analysis system 205 may be contained in the car 200. The analysis system 205 may include a first machine learning algorithm (MLA) 230 and/or a second MLA 250. The set of still images 225 may be input to the first MLA 230. The first MLA 230 may output a set of predicted status vectors 240.

For each bulb of each traffic signal in the set of still images 225, the first MLA 230 may predict a status of the bulb. The predicted status may include a predicted likelihood for each possible color of the bulb, whether the bulb is on or off, and/or whether the status is unknown. The predicted status may be in the format of a multi-dimensional vector, where each dimension corresponds to one status, such as one color. The output may be coded using one hot encoding, in which each category is represented using a binary variable.

The predicted status vectors 240 may be input to a second MLA 250. The MLA 250 may output a predicted state of the traffic signal 260. The predicted state 260 may indicated a predicted probability of each possible state of the traffic signal. The predicted state 260 may be in the form of a vector. The predicted state 260 may then be used to control the car 200 and/or to provide assistance to a driver of the car 200.

It should be understood that the arrangement of systems in FIG. 2 is presented as an example only, and that many variations are possible. For example a single computing device 100 may perform the functions of both the video processing system 220 and the analysis system 205. In another example, some of the functions of the video processing system 220 and/or analysis system 205 may be performed by a device that is located remotely from the car 200, such as a cloud server.

Figure 3:
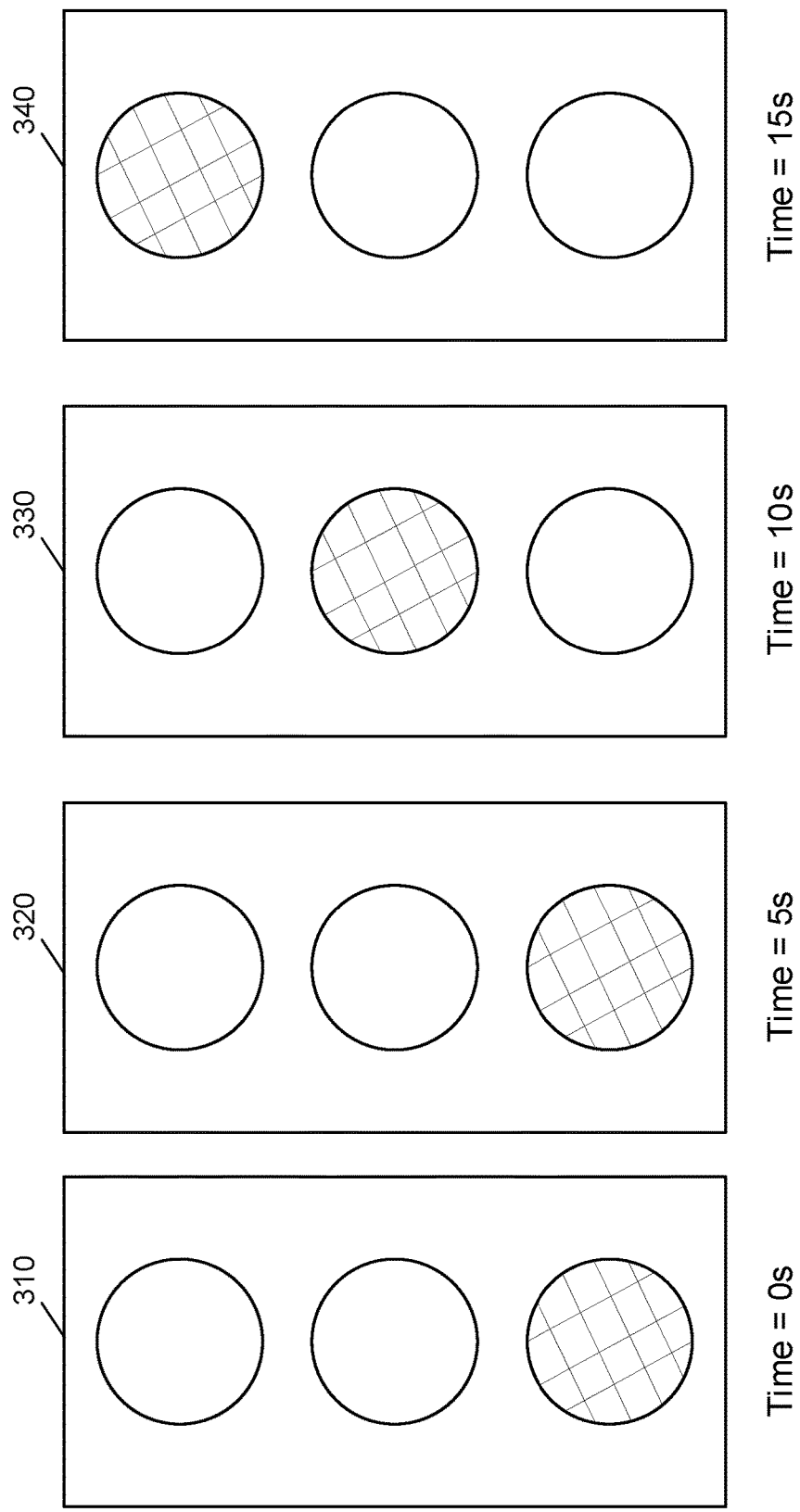
FIG. 3 depicts images of traffic signals in accordance with embodiments of the present technology.

With reference to FIG. 3, there are depicted examples of images 310-40 of a traffic signal. The images 310-40 have been captured from a video, such as by the video processing system 220. Each of the images 310-40 corresponds to a time in the video, beginning with image 310 which was captured at the beginning of the video. Although illustrated as being separated by 5 seconds, any time interval may be used for capturing the still images from a video, and in practice the time interval is likely to be much shorter.

At the beginning of the video, as indicated in image 310, the topmost bulb of the traffic signal has a status of 'off,' the middle bulb of the traffic signal has a status of 'off,' and the bottom bulb has a status of 'on' and 'green.' Although described as a bulb, any type of light source used in a traffic signal may be captured by the video. For example, what is referred to herein as a single bulb in the traffic signal may comprise multiple light emitting diode (LED) bulbs.

The image 320 was captured five seconds after the image 310. The traffic signal has the same state in the images 310 and 320. Each of the three bulbs in the signal has the same status in the images 310 and 320. In the image 330, the signal has changed from green to yellow. The topmost bulb still has a status of 'off.' The middle bulb now has a status of 'on' and 'yellow,' and the bottom bulb has the status 'off.' In the image 340, the signal has changed to red. The topmost bulb now has a status of 'red,' and the middle and bottom bulbs have the status 'off.'

Figure 4:
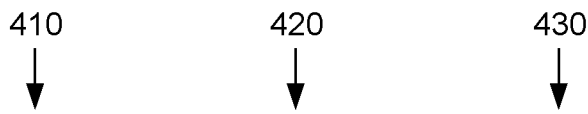
FIG. 4 depicts a labeled representation of a traffic signal still image in accordance with embodiments of the present technology.

With reference to FIG. 4, there is depicted an example of labeled statuses of traffic signal bulbs in accordance with embodiments of the present technology. The labeled statuses correspond to a vector representing each bulb of the traffic signal. Column 410 indicates the status of a first bulb in a traffic signal. The first bulb is indicated as off. Column 420 indicates the status of a second bulb in the traffic signal. Like the first bulb, the second bulb is off. Column 430 indicates the status of a third bulb in the traffic signal. The third bulb is indicated to be green.

Figure 5:
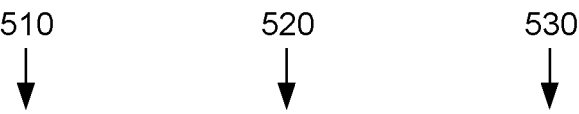
FIG. 5 depicts predicted statuses of a traffic signal still image in accordance with embodiments of the present technology.

The data in FIG. 4 represents the vectors created when a human viewer (a professional assessor or a crow-sourced assessor) labels an image of a traffic signal, such as the image 310. This labeled data may be used to train an MLA, such as the first MLA 230. When the viewer labels the image, each dimension may have either a '0' or a '1' (corresponding to 0% and 100%) because the viewer labeling the image is certain of the status of each bulb. The actual status of each bulb is known because the viewer has labeled the bulb. In contrast, FIG. 5 depicts an example of predicted status vectors for a traffic signal. Rather than being whole numbers, predicted status vectors will typically fall between '0' and '1.'

The data in FIG. 5 is an example of predicted status vectors, such as those output by the first MLA 230. In the column 510, the most likely predicted status of bulb 1 is 'off,' which has a predicted likelihood of 0.92 or 92%. The sum of the predicted likelihoods of all statuses for each bulb is equal to one. In column 520, the status with the highest predicted likelihood is also 'off,' and in column 530 the status with the highest predicted likelihood is 'green.'

FIGS. 4 and 5 illustrate five examples of statuses, 'red,' 'yellow,' 'green,' 'arrow,' and 'offline,' but not all of these statuses may be used. Also, other statuses may be used. For example 'arrow' may be removed and replaced with 'left turn arrow,' 'right turn arrow,' and 'straight arrow.' In some instances the status 'on' may be used. In other instances it may be assumed that the bulb is on if the status is anything other than 'off.' An 'unknown' status (not illustrated) may be used to indicate that the status of the bulb cannot be determined. For example the 'unknown' status may be selected or predicted when the traffic signal is obstructed or if adverse weather conditions affect the video of the traffic signal.

With reference to FIG. 6, there is depicted an example of labeled states of a traffic signal video in accordance with embodiments of the present technology. The labeled states may have been input by a person watching a video of a traffic signal. The person watching the video may input a state of the traffic signal each time the traffic signal changes states. A data point may then be recorded indicating a time at which the state changed and the state of the traffic signal after the state has changed. In alternative non-limiting embodiments of the present technology, the person watching the video may label intervals for a given state—a start time and an end time, when the given state occurs. A computer interface may be provided to enable the person watching the video to assign labels to the video.

FIG. 6 illustrates an example of vectors that may be used for training an MLA, such as the second MLA 250. The vectors illustrated in FIG. 6 may be determined based on states input by a person viewing a video of the traffic signal. The illustrated vectors in FIG. 6 correspond to the traffic signal images in FIG. 3. At the beginning of the video, the state of the traffic signal is 'green.' At 5 seconds, the state of the traffic signal is still 'green.' At 10 seconds, the state of the traffic signal is 'yellow,' and at 15 seconds the state of the traffic signal is 'red.'

The video may be displayed to a human viewer. The viewer may enter inputs on a timeline indicating the times at which the traffic signal changes states. Vectors used for training the second MLA 250 may be determined based on labels input by the viewer indicating changes to the state of the traffic signal. For example if the labels indicate that a traffic signal changes from red to green at 3 seconds into the video, all vectors generated for times between 0 and 3 seconds would indicate that the state is red, and all vectors generated for times after 3 seconds would indicate that the state is green.

Although FIG. 6 illustrates an example in which vectors are created for every 5 seconds, any interval may be used for generating the training data and in practice the interval is likely to be much smaller, such as 10 milliseconds. The available states illustrated in FIG. 6 are exemplary. Not all of the illustrated states may be used and/or other states that are not illustrated may be used. For example other states that may be used include "green arrow," "red arrow," "flashing green," "flashing yellow," "flashing red," etc. In some non-limiting embodiments of the present technology, the states may be averaged over a pre-determined periods of time.

Method (Non-Limiting Embodiment)

With reference to FIGS. 7 and 8, there is depicted a flow chart of a method 700, the method 700 being implementable in accordance with non-limiting embodiments of the present technology.

Step 705—Retrieve Labeled Still Images of Traffic Signals

The method 700 begins at step 705. At step 705 labeled still images of traffic signals may be retrieved. The images and associated labels may be retrieved from a database. The labeled still images may be used as training data to train an MLA. The still images may have been taken by a camera on a vehicle, such as by the cameras 210. The still images may have been captured from a video. Frames of the video may be extracted at pre-determined intervals, such as every 5 ms.

Each still image may have an associated label. The label may indicate a status of each bulb of the traffic signal in the still image and/or a state of the traffic signal. FIG. 3 illustrates examples of still images of traffic signals that may be retrieved. FIG. 4 illustrates examples of labels that may be associated with a still image of a traffic signal.

Each image may have been labeled individually by a person viewing the still image. For each bulb of the traffic signal, the viewer may indicate whether the bulb is on (i.e. lit) or off. If the bulb is on, the viewer may input a color of the bulb. For example for the image 330 in FIG. 3, the viewer may input 'off' for the topmost bulb, 'on' and 'yellow' (or just 'yellow') for the middle bulb, and 'off' for the bottom bulb.

Rather than displaying the entire traffic signal to the viewer labeling the image, the individual bulbs may be isolated and each bulb may be individually displayed to the viewer. The boundaries of the traffic signal and/or bulbs within the image may be determined using image recognition techniques and/or based on known location data stored in maps. The known location data may include previously recorded information indicate the locations of traffic signals.

The labels may be automatically generated based on input from a user, such as based on user input indicating a state of the traffic signal. For example if a user inputs that the state of a traffic signal is 'green' for a certain period of time, all images corresponding to that time period may be labeled with an 'off' status for a top bulb, an 'off' status for a middle bulb, and a 'green' status for a bottom bulb of the traffic signal.

Step 710—Train a First MLA

At step 710 a first MLA, such as the first MLA 230, may be trained to receive an image of a traffic signal as an input and output a predicted status of each bulb of a traffic signal. To train the first MLA, the labelled still images may be fed into the first MLA. The labels may be in the form of vectors, such as the vectors illustrated in FIG. 4. The output of the first MLA may also be in the format of vectors, such as the vectors illustrated in FIG. 5. The format of the output may match the format of the labels. The first MLA may comprise multiple MLAs, such as a first MLA to predict a color of each bulb of the traffic signal and a second MLA to predict whether each bulb is displaying a left arrow or right arrow.

The first MLA may be a neural network and/or any other type of MLA model. The first MLA may include multiple models. In some instances, the multiple models may form a chain in which the output of a first model (or multiple models) is input into a second model. In other instances, each model may make a prediction and those predictions may be used to determine a final prediction. For example an average of the outputs of the multiple models may be determined as the output of the first MLA.

For each still image, the MLA may predict a status of each bulb of the traffic signal in the still image. The prediction may then be compared to the label which indicates the actual status of each bulb of the traffic signal. An amount of error may be determined, such as by using a loss function. The loss function may be pre-determined. The amount of error may indicate a difference between the predicted status of the bulb and the label (actual status of the bulb). The amount of error may be determined in the format of a vector.

After determining an amount of error, such as by using the loss function, the first MLA may be adjusted based on the amount of error. The first MLA may be adjusted so that if the MLA were given the same input again, the difference between the predicted status and the actual status would be reduced.

The first MLA may continue to be trained using the labeled training data until the first MLA achieves a pre-determined threshold of accuracy and/or has been trained using a pre-determined amount of labelled still images. Some of the available labelled still images might not be used to train the first MLA. Rather, these labelled still images may be used to test the accuracy of the first MLA.

Step 715—Retrieve Labeled Videos of Traffic Signals

At step 715 labeled videos of traffic signals may be retrieved. The labels may indicate actual states of the traffic signals in the videos. The labels may indicate time periods corresponding to each state of the traffic signal. FIG. 6 illustrates an example of labels that may be associated with a video of a traffic signal. The labeled videos may be retrieved from a database. The videos may have been recorded by cameras on a car, such as the cameras 210.

As described above, a viewer may have labeled the videos with a state of the traffic signal in the video. The viewers may be presented a short video, such as a three to ten second long video of a traffic signal. The viewer may then input the states of the traffic signal on a timeline corresponding to the video. Each time the traffic signal changes states in the video, the viewer may indicate in the timeline that the traffic signal has changed states.

Step 720—Generate Still Images from the Videos

At step 720 still images may be generated from the videos retrieved at step 715. The still images may be generated by extracting frames of the videos. The still images may be generated at pre-determined intervals, such as every 50 ms of the video. Rather than indicating an exact time for the interval between each image, a time period may be specified, such as between every 4 and 6 ms. An image may then be selected during this time period based on various criteria, such as attempting to select an image in which the traffic signal is in focus. In some instances multiple frames of the video may be combined to form the still image.

Filters and/or other modifications may be applied to the images and/or videos. As described above, the videos and/or still images may be modified to isolate the traffic signals in the videos and/or images. For example the videos and/or still images may be cropped to remove portions of the videos and/or still images that do not include a traffic signal. The brightness, contrast, levels, etc. of the images may be adjusted.

Step 725—First MLA Outputs Predicted Status Vectors

At step 725 the still images generated at step 720 may be input to the trained first MLA. The first MLA may then output, for each bulb in each image, a predicted status of the bulb. The predicted status may be in the format of a vector. The prediction vectors for each bulb may be stored in a matrix. The predicted statuses may be encoded using one hot encoding.

Although described as an individual vector for each bulb, in some instances the prediction for each bulb may be combined and a single prediction may be generated for each image or each traffic signal in each image. For example a single vector may be output for each traffic signal, where the single vector indicates a predicted status for each bulb of the traffic signal.

Step 730—Train a Second MLA

At step 730 a second MLA may be trained. The training data used to train the second MLA may include the predicted status vectors output at step 725 and the actual states of the traffic signal retrieved at step 715. The second MLA may receive a set of predicted status vectors as input and output a predicted state of the traffic signal. For example the second MLA may receive predicted status vectors corresponding to five seconds of a video of a traffic signal, and may then output a predicted state of the traffic signal after the five seconds. The output predicted state may be in the format of a vector.

The second MLA may be a neural network and/or any other type of MLA model. The second MLA may include multiple models. In some instances, the multiple models may form a chain in which the output of a first model (or multiple models) is input into a second model. In other instances, each model may make a prediction and those predictions may be used to determine a final prediction. For example an average of the outputs of the multiple models may be determined as the output of the second MLA.

After the second MLA generates a predicted state of the traffic signal, the prediction may be compared to the label, from the data retrieved at step 715, indicating the actual state of the traffic signal. An amount of error may be determined, such as by using a loss function. The loss function may be pre-determined. The amount of error may indicate a difference between the predicted state of the traffic signal and the label (actual state of the traffic signal). The amount of error may be determined in the format of a vector.

After determining an amount of error, such as by using the loss function, the second MLA may be adjusted based on the amount of error. The second MLA may be adjusted so that if the MLA were given the same input again, the difference between the predicted state and the actual state would be reduced.

The second MLA may continue to be trained using the labeled training data until the second MLA achieves a pre-determined threshold of accuracy and/or has been trained using a pre-determined amount of training data points. Some of the available training data points might not be used to train the second MLA. Rather, these training data points may be used to test the accuracy of the second MLA.

Step 735—Capture Video of a Traffic Signal

At step 735 a video of a traffic signal may be captured, such as by the cameras 210 on the car 200. The car 200 may be moving while the video is being captured. The video may include a single traffic signal or multiple traffic signals. Portions of the video might not include any traffic signals.

One or more locations corresponding to the video may be recorded. The locations may indicate a location of a car carrying the camera when the video is being captured. Mapping data may indicate the approximate location of traffic signals. This information may be used to capture the video of the traffic signals. For example the cameras 210 may be directed to capture video of the known location of the traffic signals.

Step 740—Generate Still Images of the Traffic Signal

At step 740 still images of the traffic signal captured in the video at step 735 may be generated. The images may be generated in the same manner that the images were generated at step 720 for training the second MLA. If the images at step 720 were generated at intervals of 5 ms, the images at step 740 may also be generated at intervals of 5 ms. Any other actions performed at step 720 may be performed at step 740, such as isolating the traffic signal within the image.

Although described as a video, a series of still images of the traffic signal may be captured at step 735. If a series of still images is captured at step 735, all or a portion of the actions performed at step 740 may be skipped.

Step 745—Predict Status Vectors Using First MLA

At step 745 the still images at step 740 may be input to the first MLA. The first MLA may have previously been trained at step 710 to predict a status for each bulb of each image. The first MLA may determine a predicted status of each bulb of the still images generated at step 740. The first MLA may output a predicted status vector for each bulb of each of the still images. The vectors may indicate a predicted status of each bulb, such as 'green,' 'red,' 'offline,' etc. FIG. 5 illustrates an example of predicted status vectors. The predicted status vectors may be stored in a matrix and/or a multidimensional graph.

The predicted status may include an indicator of confidence for each predicted status. For example for the column 530 in FIG. 5, the predicted status may be 'Green' and a confidence for the status may be 91%.

Still images of multiple traffic signals may be input to the first MLA, such as still images of multiple traffic signals from a same intersection. The output of the first MLA for each traffic signal may be aggregated, such as by averaging the values output by the MLA for each of the traffic signals.

Step 750—Predict State Using Second MLA

At step 750 all or a portion of the status vectors generated at step 745 may be input to the second MLA. If the predicted status vectors were stored in a matrix, the matrix may be input to the second MLA. The second MLA may have previously been trained at step 730. The second MLA may use the status vectors generated at step 745 to determine a predicted state of the traffic signal.

The predicted state may include a predicted color of the traffic signal (green, red, etc.), a predicted symbol displayed by the traffic signal (arrow, walk symbol, etc.), and/or a predicted pattern displayed by the traffic signal (solid, flashing, etc.). In the video of the traffic signal captured at step 735 the traffic signal may appear to be flickering, although to the human eye the traffic signal might be a solid light. Despite the flickering, the second MLA may be able to discern whether the traffic signal is intended to be a solid light or a flashing light (such as a flashing green indicating a protected turn). The predicted state may be output as a vector. The vector may indicate an amount of confidence for the prediction of each of the states. The confidence for each of the predicted states may be compared to determine the predicted state to output. The predicted state having the highest confidence may be output.

The predicted state of the traffic signal may be a predicted state of the traffic signal at the time of the last still image input to the second MLA. For example if a series of images is input to the second MLA, where the most recent image was captured at 11:56:03, the second MLA may output a prediction of the state of the traffic signal at 11:56:03.

In some instances, the second MLA may output a prediction of the state of the traffic signal for a future time, or predict multiple future traffic states. For example the second MLA may output a prediction of the state of the traffic signal at the time of the latest image input to the second MLA and a state of the traffic signal one second after the time of the latest image input to the second MLA.

Step 755—Output Predicted State

At step 755 the predicted state of the traffic signal may be output. The predicted state may be used to determine the actions of a self driving car, such as the car 200. The predicted state may be used to determine whether the self driving car should adjust its speed or direction. For example the predicted state may be used to determine whether the car 200 should stop at the intersection with the traffic signal or continue traveling through the intersection.

The predicted state may be used to assist a driver of a car. For example, the predicted state may be used to warn a driver if the driver is not slowing down as they approach a traffic signal that is predicted to be red.

While the above-described implementations have been described and shown with reference to particular steps performed in a particular order, it will be understood that these steps may be combined, sub-divided, or re-ordered without departing from the teachings of the present technology. At least some of the steps may be executed in parallel or in series. Accordingly, the order and grouping of the steps is not a limitation of the present technology.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be used as examples rather than limiting. The scope of the present technology is therefore intended to be limited solely by the scope of the appended claims.

The invention claimed is:

1. A method for determining a predicted state of a traffic signal, the method executable on a server, the method comprising:
   receiving, by the server, a video of the traffic signal;
   generating, based on the video, a plurality of still images of the traffic signal;
   determining, for each still image of the plurality of still images, and by a first Machine Learning Algorithm (MLA), a vector for each bulb in the respective still image, thereby generating a plurality of vectors corresponding to the video,
      each vector indicating a predicted likelihood of each of a plurality of statuses of the respective bulb,
      the first MLA having been trained based on a plurality of labeled still images of traffic signals, and
      each labeled still image of the plurality of labeled still images indicating a status of each bulb of the respective labeled still image;
   determining, based on the plurality of vectors, and by a second MLA, the predicted state of the traffic signal,
      the second MLA having been trained based on a plurality of labeled vectors, wherein each labeled vector is indicative of a predicted likelihood of each of the plurality of statuses for a given bulb of a given traffic signal,
      wherein each labeled vector is associated with a label indicating an actual state of the given traffic signal,
      wherein the second MLA outputs an indicator of confidence for each state, and
      wherein the determining the predicted state of the traffic signal comprises comparing the indicators of confidence for each state; and
   storing an indicator of the predicted state of the traffic signal.

2. The method of claim 1, wherein the plurality of statuses comprise a pre-defined set of statuses.

3. The method of claim 1, wherein a first status of the plurality of statuses corresponds to a first color and a second status of the plurality of statuses corresponds to a second color.

4. The method of claim 3, wherein a third status of the plurality of statuses indicates whether the bulb is lit.

5. The method of claim 1, wherein the predicted state of the traffic signal indicates a predicted color displayed by the traffic signal.

6. The method of claim 1, wherein the predicted state of the traffic signal indicates a predicted symbol displayed by the traffic signal.

7. The method of claim 1, wherein the predicted state of the traffic signal indicates a predicted pattern displayed by the traffic signal.

8. The method of claim 1, wherein the plurality of labeled vectors were generated using the first MLA.

9. The method of claim 1, further comprising:
   storing the plurality of vectors in a matrix; and
   inputting the matrix to the second MLA.

10. The method of claim 1, further comprising determining, based on stored location data of traffic signals, coordinates of the traffic signal in the video.

11. The method of claim 1, wherein the first MLA predicts a color displayed by each bulb in an input still image.

12. A method for determining a predicted state of a traffic signal, the method executable on a server, the method comprising:
- receiving, by the server, a video of a plurality of traffic signals, wherein the plurality of traffic signals comprises the traffic signal;
- generating, based on the video, a plurality of still images of the plurality of traffic signals;
- determining, for each still image of the plurality of still images, and by a first Machine Learning Algorithm (MLA), a vector for each bulb in the respective still image, thereby generating a plurality of vectors corresponding to the video,
  - each vector indicating a predicted likelihood of each of a plurality of statuses of the respective bulb,
  - the first MLA having been trained based on a plurality of labeled still images of traffic signals, and
  - each labeled still image of the plurality of labeled still images indicating a status of each bulb of the respective labeled still image;
- determining, based on the plurality of vectors, and by a second MLA, a predicted state of each of the plurality of traffic signals,
  - the second MLA having been trained based on a plurality of labeled vectors, wherein each labeled vector indicating a predicted likelihood of each of the plurality of statuses for a given bulb of a given traffic signal,
  - wherein each labeled vector is associated with a label indicating an actual state of the given traffic signal,
  - wherein the second MLA outputs an indicator of confidence for each state, and wherein the determining the predicted state for each of the plurality of traffic signals comprises comparing the indicators of confidence for each state of a respective traffic signal;
- determining, based on the predicted state of each of the plurality of traffic signals, the predicted state of the traffic signal; and
- storing an indicator of the predicted state of the traffic signal.

13. The method of claim 12, wherein determining the predicted state of the traffic signal comprises comparing the predicted state of each of the plurality of traffic signals.

14. The method of claim 12, wherein the plurality of labeled vectors were generated using the first MLA.

15. The method of claim 12, wherein generating the plurality of still images comprising capturing, at a predefined interval, frames of the video.

16. The method of claim 12, further comprising:
- storing the plurality of vectors in a matrix; and
- inputting the matrix to the second MLA.

17. The method of claim 12, further comprising determining, based on stored location data of traffic signals, coordinates of each of the traffic signals in the video.

18. A system for determining a predicted state of a traffic signal, the system comprising:
- a processor; and
- a non-transitory computer-readable medium comprising instructions,
- the processor, upon executing the instructions, being configured to:
  - receive a video of the traffic signal;
  - generate, based on the video, a plurality of still images of the traffic signal;
  - determine, for each still image of the plurality of still images, and by a first Machine Learning Algorithm (MLA), a vector for each bulb in the respective still image, thereby generating a plurality of vectors corresponding to the video,
    - wherein each vector indicates a predicted likelihood of each of a plurality of statuses of the respective bulb,
    - wherein the first MLA is trained based on a plurality of labeled still images of traffic signals, and
    - wherein each labeled still image of the plurality of labeled still images indicates a status of each bulb of the respective labeled still image;
  - store the plurality of vectors in a matrix;
  - input the matrix to a second MLA;
  - determine, based on the plurality of vectors, and by the second MLA, the predicted state of the traffic signal,
    - wherein the second MLA is trained based on a plurality of labeled vectors,
    - wherein each labeled vector indicates a predicted likelihood of each of the plurality of statuses for a bulb of a traffic signal, and
    - wherein each labeled vector is associated with a label indicating a state of the traffic signal; and
  - store an indicator of the predicted state of the traffic signal.

19. The system of claim 18, wherein the second MLA outputs an indicator of confidence for each state.

20. The system of claim 19, wherein the instructions that cause the processor to determine the predicted state of the traffic signal comprise instructions that cause the processor to select a state having a highest confidence.

* * * * *